US006417869B1

(12) United States Patent
Do

(10) Patent No.: US 6,417,869 B1
(45) Date of Patent: Jul. 9, 2002

(54) METHOD AND SYSTEM OF USER INTERFACE FOR A COMPUTER

(75) Inventor: Cuong D. Do, Woodland Hills, CA (US)

(73) Assignee: Citicorp Development Center, Inc., Los Angeles, CA (US)

( * ) Notice: Subject to any disclaimer, the term of this patent is extended or adjusted under 35 U.S.C. 154(b) by 0 days.

(21) Appl. No.: 09/267,300

(22) Filed: Mar. 15, 1999

Related U.S. Application Data

(60) Provisional application No. 60/081,759, filed on Apr. 15, 1998.

(51) Int. Cl.[7] ................................................. G06F 3/00
(52) U.S. Cl. ........................ 345/718; 345/717; 345/810; 345/841; 345/839; 345/773
(58) Field of Search ..................... 705/70, 73; 345/716, 345/717, 718, 719, 781, 808, 809, 810, 825, 841, 902, 962, 720, 853, 854, 771, 773, 753, 756; 709/204

(56) References Cited

U.S. PATENT DOCUMENTS

| 5,636,211 | A | | 6/1997 | Newlin et al. .............. 370/465 |
| 5,675,390 | A | | 10/1997 | Schindler et al. ............ 348/552 |
| 5,722,041 | A | | 2/1998 | Freadman .................... 455/6.3 |
| 5,734,828 | A | | 3/1998 | Pendse et al. ......... 395/200.33 |
| 5,815,577 | A | * | 9/1998 | Clark .......................... 380/52 |
| 6,002,403 | A | * | 12/1999 | Sugiyama et al. .......... 345/717 |
| 6,073,119 | A | * | 6/2000 | Bornemisza-Wahr et al. . 705/42 |
| 6,212,547 | B1 | * | 4/2001 | Ludwig et al. ............. 709/204 |
| 6,236,398 | B1 | * | 5/2001 | Kojima et al. .............. 345/719 |

FOREIGN PATENT DOCUMENTS

JP          WO97/48038          12/1997          ............. G06F/3/02

* cited by examiner

Primary Examiner—Raymond J. Bayerl
Assistant Examiner—Kieu D. Vu
(74) Attorney, Agent, or Firm—George T. Marcou; Kilpatrick Stockton LLP

(57) ABSTRACT

A method and system of user interface for a full function computer centered, for example, in a user's living room automatically displays a screen for a control center application folder, for a plurality of bundled applications, from which the user selects an application, such as a home banking application. The system automatically displays a function selection screen for the selected application, from which the user selects an application function, and the system automatically implements the selected function.

58 Claims, 18 Drawing Sheets

METHOD AND SYSTEM OF USER INTERFACE FOR A COMPUTER

CROSS-REFERENCE TO RELATED APPLICATIONS

This application claims the benefit of U.S. Provisional Application Ser. No. 60/081,759 filed Apr. 15, 1998 pending.

FIELD OF THE INVENTION

The present invention relates generally to multi-purpose computer systems and in particular to a method and system of user interface for a full function computer centered, for example, in a users living room for use as a home theater and entertainment environment and an education and information resource, including home banking.

BACKGROUND OF THE INVENTION

The consumer electronics industry has created various types of Internet set-top boxes which provide a method and system for the single function of Internet access through a consumers television set. However, such systems do not provide a method and system for user interface with a full function computer centered, for example, in the consumer's living room for use as a home theater, entertainment, education, information, and home banking personal computer.

There is a present need for a method and system for user interface with a full function computer for use as a home theater, entertainment, education, information, and home banking personal computer which is designed to optimize for television display, that is easy to use from a remote location, and which does not require the user to have any previous experience with personal computers.

SUMMARY OF THE INVENTION

It is a feature and advantage of the present invention to provide a method and system of user interface with a full function computer for use as a home theater, entertainment, education, information, and home banking personal computer.

It is a further feature and advantage of the present invention to provide a method and system of user interface with a full function computer as a home theater, entertainment, education and information, and home banking environment which is designed to optimize for television display.

It is an additional feature and advantage of the present invention to provide a method and system of living room interface with a full function computer as a home theater and entertainment environment and education and information resource, including home banking, which is easy for the user to use, for example, when away from the living room.

It is another feature and advantage of the present invention to provide a method and system of user interface with a full function computer as a home theater, entertainment, education, information, and home banking personal computer, which does not require the user to have any previous experience using a personal computer.

To achieve the stated and other features, advantages and objects of the present invention, an embodiment of the invention provides a method and system of user interface for a computer which automatically displays a screen for a control center application folder that represents a plurality of bundled applications for the computer upon receiving a selection for the control center application folder. The system receives a selection for at least one of the applications represented by the control center application folder and automatically displays a screen for a plurality of functions for the selected application. Upon receiving a selection for at least one of the application functions, the system automatically implements the application function. The selection of the screen for the control center application folder is made from a menu screen which automatically displays a plurality of folders for the computer system, including the control center application folder. The process of receiving all selection involves a user entering the selection at the computer in response to an automatic prompt by the system. The screen that is displayed for the control center application folder is one of a plurality of such screens. The user can enter a selection for one of the alternate screens, and upon receiving the selection of an alternate screen, the system automatically displays an alternate screen for the control center application folder.

In an embodiment of the present invention, the screen for the control center application folder includes a display, for example, of a living room with one or more automatically displayed graphical components such as a graphical video component, a graphical telephone component, a graphical TV component, and a graphical stereo component. The screen for the control center application folder also includes a display of various buttons, such as a home banking application folder button and a games folder button, as well as buttons for other folders. The graphical video component, for example, consists of an automatically displayed icon representing a video disk player application and includes an icon representing one or more video disk player application functions, such as a video CD function, a karaoke CD function, a movie function, and a DVD function.

In an embodiment of the present invention, the graphical telephone component consists of an icon representing a smart telephone application and includes an icon representing one or more smart telephone application functions, such as a dial function, a talk function, a caller ID function, a last number redial function, and a speed dial function. The graphical TV component consists of an icon representing a two-way video phone application and includes an icon representing one or more two-way video phone application functions, such as a camera function, a dial function, a talk function, a caller ID function, a last number redial function, and a speed dial function. The graphical stereo component consists of an icon representing a music CD application and includes an icon representing one or more music CD application functions, such as a music CD player and an audio equalizer.

In an embodiment of the present invention, the process of receiving the selection for one or more of the applications involves the user entering a selection at the computer for at least one of the applications in response to an automatic prompt by the system to enter a selection. In response to the prompt, the user can enter the selection for one or more of the applications, including for example, the video disk player application, the smart telephone application, the two-way video phone application, the music CD application, and the home banking application. The home banking application is, for example, the home banking application for a pre-selected financial institution or bank.

In an embodiment of the present invention, upon receipt of a selection, the system automatically displays a screen with a plurality of control functions for the selected application. The screen representing the plurality of control functions includes one or more automatically displayed icons for one or more control functions for the selected application. Automatically displayed icons for the video disk player application control functions include, for example, a screen mode control, a volume control, a forward control, a reverse control, a freeze picture control, a pause control, a disk ejecting control, and a power control. The icons automatically displayed for the smart telephone application control functions include, for example, a talk control, a dial control, and a power control. The icons that are automatically displayed for the two-way video phone application control function include, for example, a talk control, a dial control, a video transmit control, and a power control. The automatically displayed icons for the music CD player application functions include, for example, a volume control and a power control.

In an embodiment of the present invention, receiving the selection for one or more application functions involves entering the selection by the user at the computer in response to an automatic prompt by the system. In response to the prompt, the user enters a selection for one or more of the application functions. For example, in response to the prompt, the user enters a selection, one or more of the functions for the video disk player application, the smart telephone application, the two-way video phone application, the music CD application, and the browser function for the home banking application, which is pre-programmed, for example, for the home banking application of the pre-selected financial institution or bank.

In an embodiment of the present invention, automatically implementing the selected application function involves the system automatically implementing one or more application functions of the video disk player application, the smart telephone application, the two-way video phone application, the music CD application, and the home banking application. The browser function of the home banking application is pre-programmed with the website of the pre-selected financial institution or bank as the home page of the system, and the browser function automatically initiates communication with the pre-selected financial institution, for example, over the Internet or other computer network.

An embodiment of the present invention provides a system which makes use of one or more application programs running on the user's computer, such as the user's PC, which automatically prompts the user to enter the various selections. The system receives the user's selection for the control center application center folder, which represents a plurality of bundled applications, and automatically displays the screen for the control center application folder. The system receives the user's selection for one or more of the plurality of bundled applications, and automatically displays a screen representing the various functions of the selected application or applications. The system receives the user's selection of one or more of the application functions and automatically implements the selected function or functions.

Additional objects, advantages and novel features of the invention will be set forth in part in the description which follows, and in part will become more apparent to those skilled in the art upon examination of the following or may be learned by practice of the invention.

BRIEF DESCRIPTION OF THE DRAWINGS

FIG. 2 shows somewhat schematically an infrared keyboard for use in controlling the PC illustrated in. FIG. 1 for an embodiment of the present invention;

DETAILED DESCRIPTION

Figure 1:
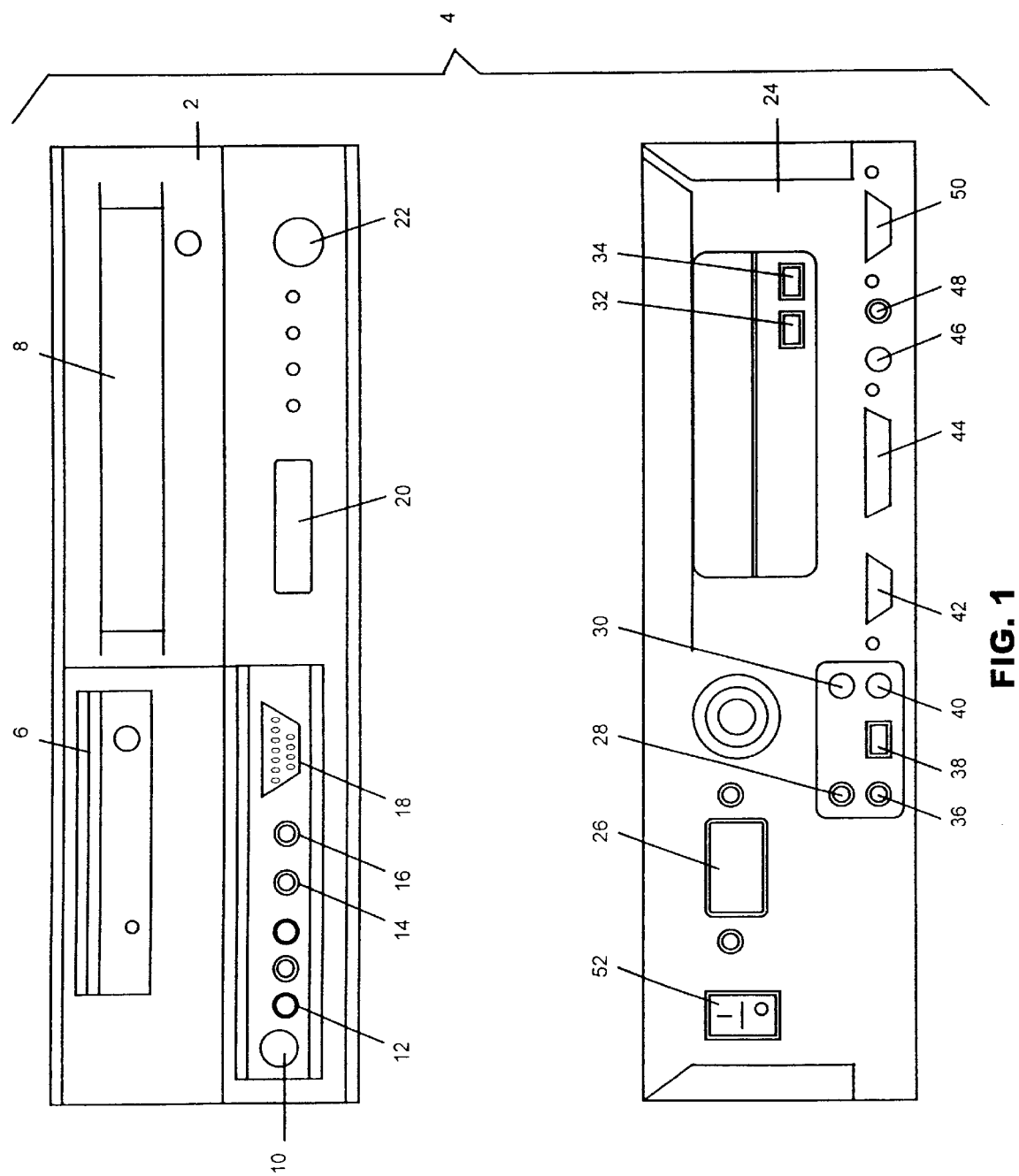
FIG. 1 is a somewhat schematic diagram showing the front and rear panels of the PC component for an embodiment of the present invention.

Referring now in detail to an embodiment of the invention, an example of which is illustrated in the accompanying drawings, FIG. 1 is a somewhat schematic diagram which shows the front panel 2 of a personal computer (PC) component 4 for an embodiment of the present invention. An embodiment of the present invention utilizes a low-cost, fully functioning PC 4 for use, for example, in a user's living room as a home theater, entertainment, education, and information PC. The PC 4 has a floppy disk drive 6 and a CD-ROM drive 8 and includes, on the front panel 2 of the PC 4, connections, for example, for S-Video 10 in, video in from camera 12, earphone 14, microphone from microphone 16, game port 18, and IR receiver 20, as well as a power switch 22. FIG. 1 also shows the rear panel 24 of the PC component 4 for an embodiment of the present invention. The PC 4 also includes, on rear panel 24 of the PC, connections, for example, for AC power 26, audio line in 28, mouse 30, telephone handset 32, telephone line 34, audio output to TV audio in 36, ethernet 38, keyboard 40, serial port 42, printer port 44, S-video output to TV S-video 46, video output to TV video in 48, SVGA monitor 50, as well as a power switch 52.

Figure 2:
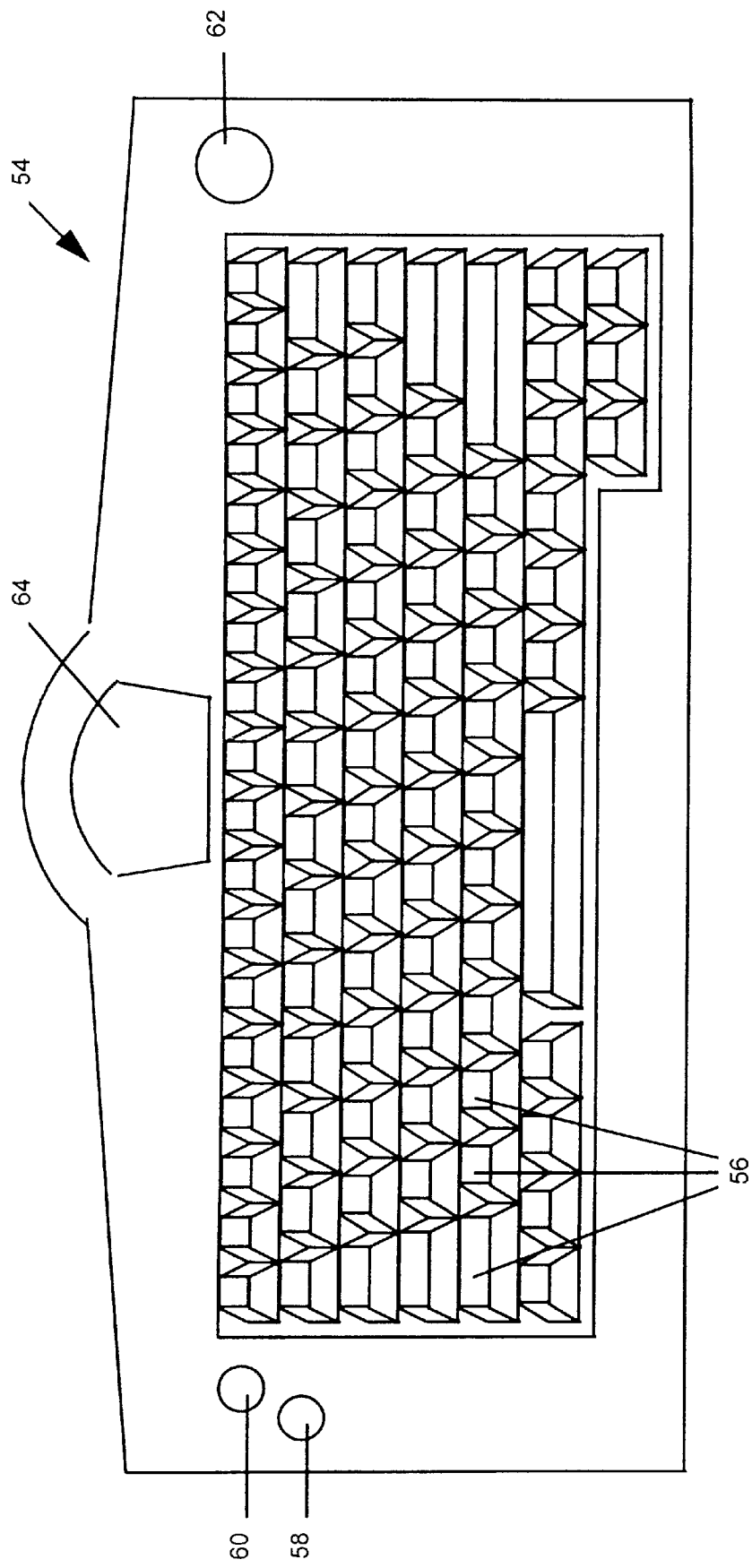
Figure 3:
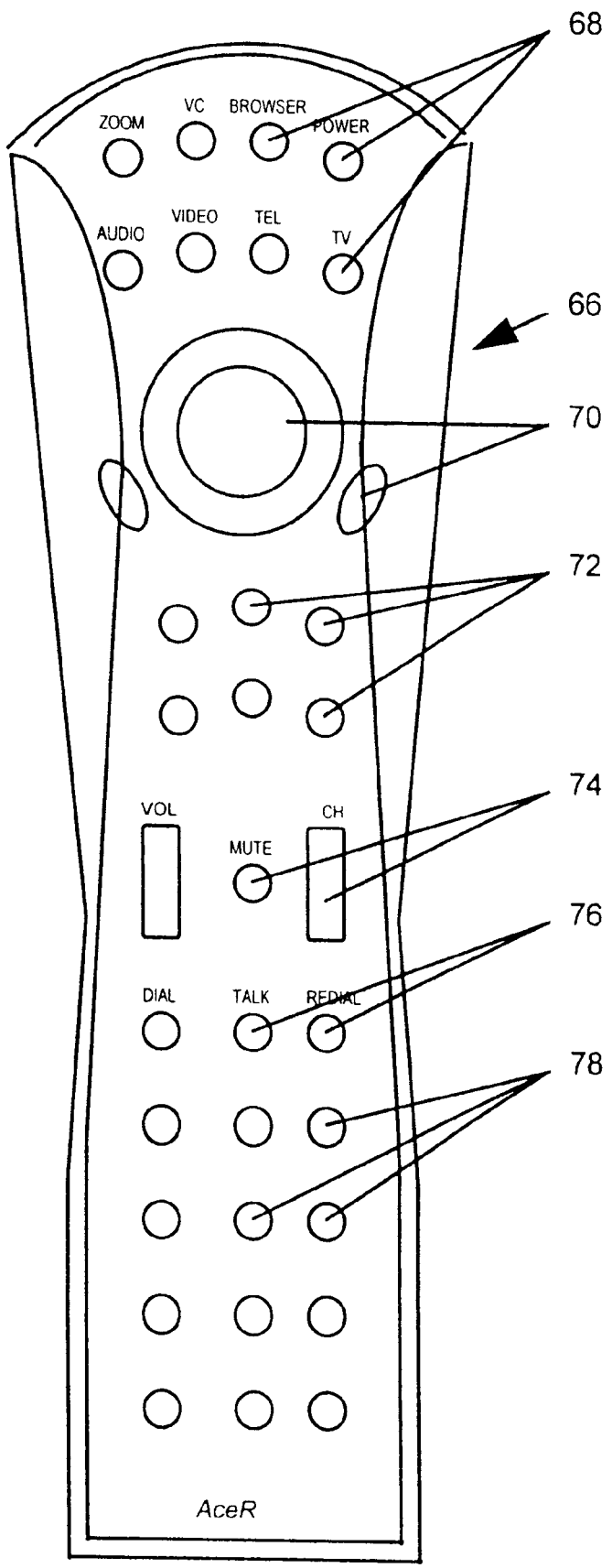
FIG. 3 shows somewhat schematically an infrared remote control unit for use in controlling the PC illustrated in FIG. 1 for an embodiment of the present invention.

In an embodiment of the present invention, the PC 4 includes connections for a keyboard 40, a mouse 30, and an IR receiver 20. Thus, the PC is controlled via a connected keyboard or mouse or by an infrared keyboard or remote control unit communicating with the computer via an I/R transmitter. FIG. 2 shows somewhat schematically an infrared keyboard 54 for use in controlling the PC 4 for an embodiment of the present invention. In addition to keys 56, the infrared keyboard 54 is also provided with mouse left 58 and right 60 buttons, a mouse track ball 62 and an IR transmitter 64. FIG. 3 shows somewhat schematically an infrared remote control unit 66 for use in controlling the PC 4 for an embodiment of the present invention. The infrared remote control unit 66 includes single function keys 68, a mouse 70, video/audio deck control keys 72, audio/TV control keys 74, telephone control keys 76, and a telephone keypad 78.

Figure 4:
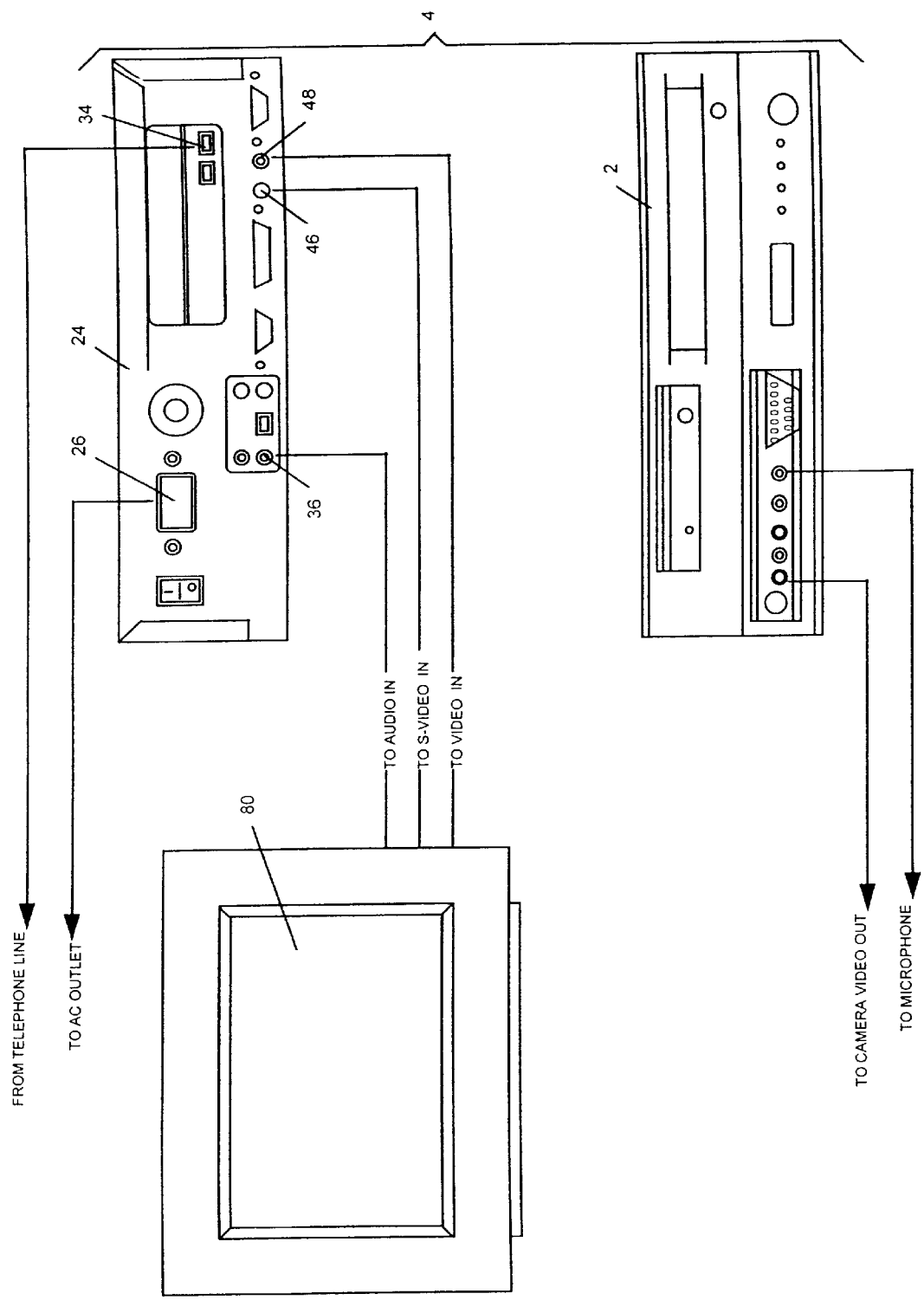
FIG. 4 is a somewhat schematic diagram showing key system hardware components for use with the PC illustrated in FIG. 1 for an embodiment of the present invention.

In an embodiment of the present invention, in order to operate the system, appropriate connections are made between the PC 4 and other system components. FIG. 4 is a somewhat schematic diagram showing the system key hardware components for use with the PC 4 for an embodiment of the present invention. Connections are made on the rear panel 24 of the PC from a telephone line to the telephone line connector 34 and from an AC outlet to the AC power connector 26. Connections are also made on the rear panel 24 of the PC 4 from the audio output connector 36 to the audio input of a TV 80, from the S-video connector 46 to the S-video input of the TV 80, and from the video output connector 48 to the video input of the TV 80. Connections are made on the front panel 2 of the PC 4 to a video input from a camera output 12 and the microphone input 16 from a microphone.

In an embodiment of the present invention, the S-video connector 46 on Video-1 input, with which most newer TV's are equipped, is used for better image quality. If the TV 80 is not equipped with S-video, composite video (RCA type) cable can be connected to the video input on the rear panel of the TV 80. The user selects Video-1 from the TV remote control or TV panel to operate the PC 4, and the TV remote control is used to switch back to TV viewing. The camera, for example, a CCD camera or camcorder, is positioned on top of the TV set 80 and the focus adjusted to where the user is seated. The microphone is positioned away from TV speaker to avoid feedback.

Figure 5:
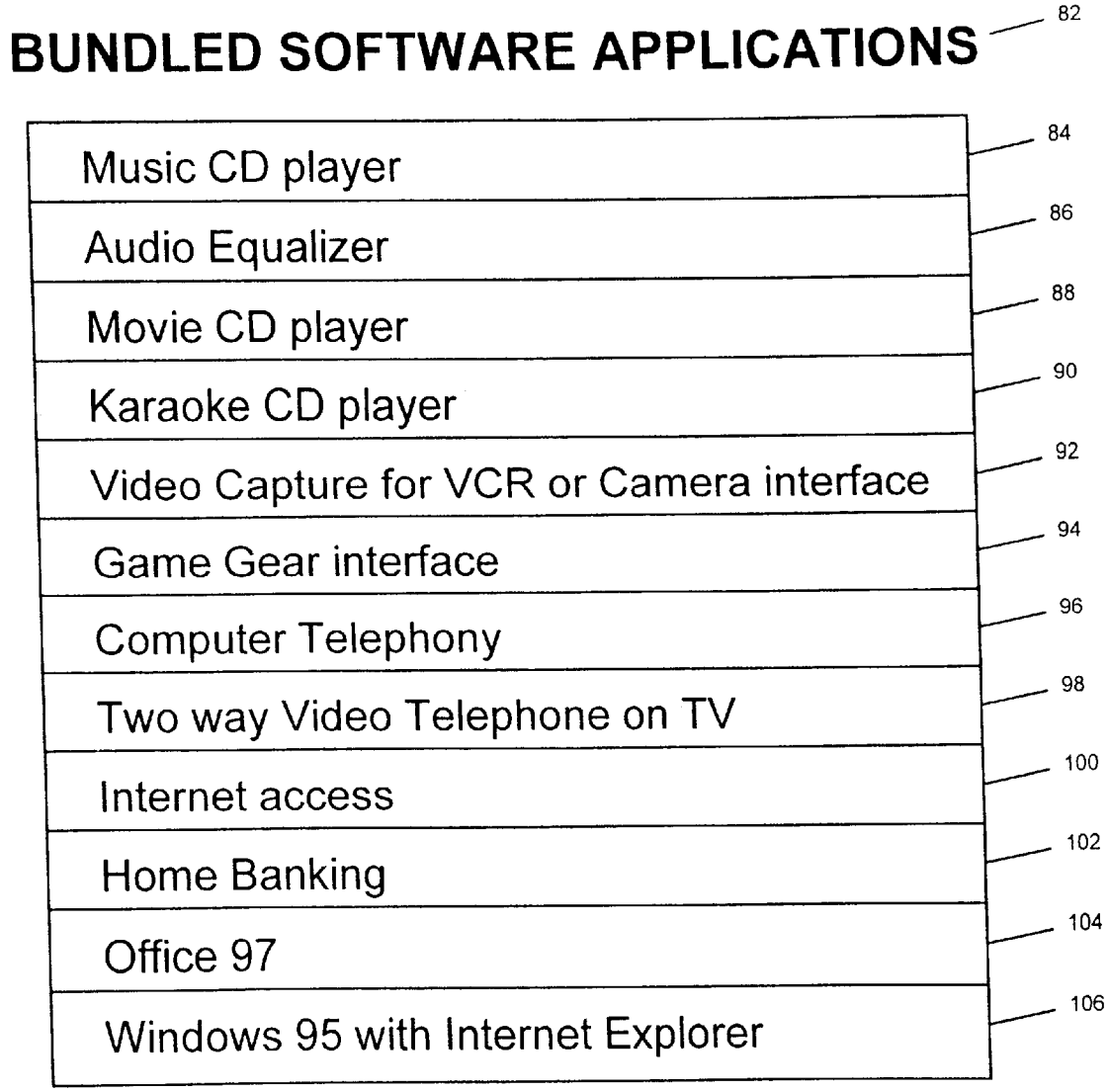
FIG. 5 is a table which illustrates bundled software applications with which the PC illustrated in FIG. 1 is pre-loaded for an embodiment of the present invention.

In an embodiment of the present invention, the PC 4 is pre-loaded with an operating system, such as Windows 95. The system utilizes a graphic user interface (GUI) that works in conjunction with the system software to prompt the user to input information and which is designed to optimize for television display and ease of remote use, for example, in the user's living room. The PC 4 is pre-loaded with bundled application software for a Living Room Control Center. FIG. 5 is a table which illustrates the bundled software applications 82 with which the PC 4 is pre-loaded for an embodiment of the present invention. The bundled applications include, for example, Music CD player 84; Audio Equalizer 86; Movie CD player 88; Karaoke CD player 90; Video Capture for VCR or camera interfaces 92; and Game Gear interface 94. The bundled application software 82 also includes, for example, Computer telephony 96; Two-way Video Telephone on Television 98; Internet access 100; Home Banking 102; Word processing, such an Office 97 104; and a Browser, such as Internet Explorer 106.

Figure 6:
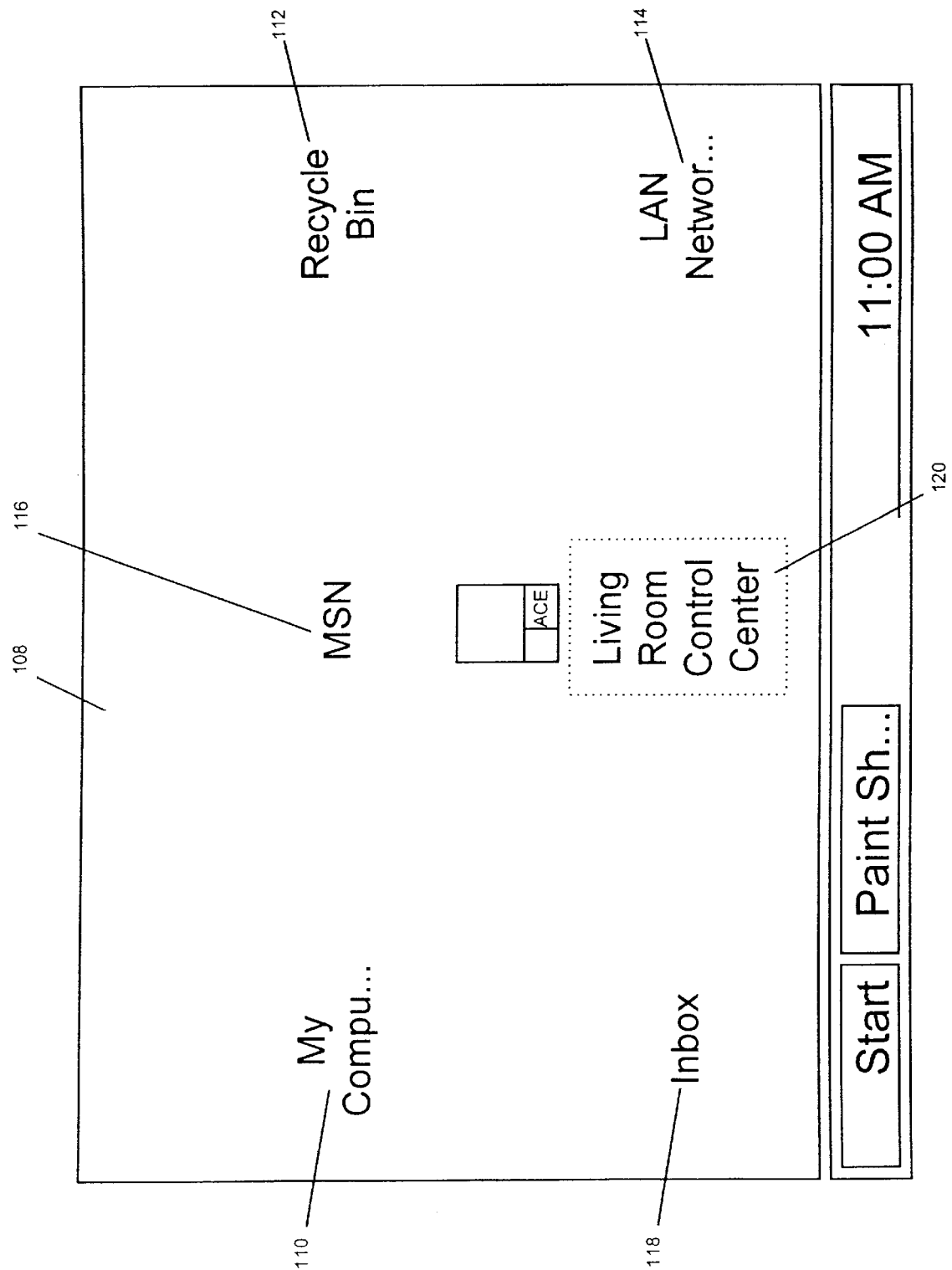
FIG. 6 shows a sample Start-Up screen for user interface for an embodiment of the present invention.

FIG. 6 shows a sample Start-Up screen for user interface for an embodiment of the present invention. The sample screens are intended to provide representative examples of input and operation information for an embodiment of the present invention. They are not intended to comprehensively describe all possible inputs and functions of the invention. When the computer 4 is activated by the user, the Start-Up screen 108 displays a number of icons on the TV screen 80, which prompts the user to select one of a number of functions of the system. The icons include, for example, My Computer 110, Recycle Bin 112, LAN Network 114, MSN 116, Inbox 118, and Living Room Control Center 120. The My Computer icon 110 represents a Windows 95 function for files access on the hard drive of the PC 4. The Recycle Bin icon 112 represents a Windows 95 function to store deleted files. The Inbox icon 118 represents a Windows 95 function for Microsoft Exchange. The LAN Network icon 114 represents a Windows 95 function for Network connection. The MSN icon 116 represents a Microsoft Internet function or the user's information service provider (ISP) function, if loaded. The Living Room Control Center icon 120 represents a main application folder for the living room interface of the present invention.

Figure 7:
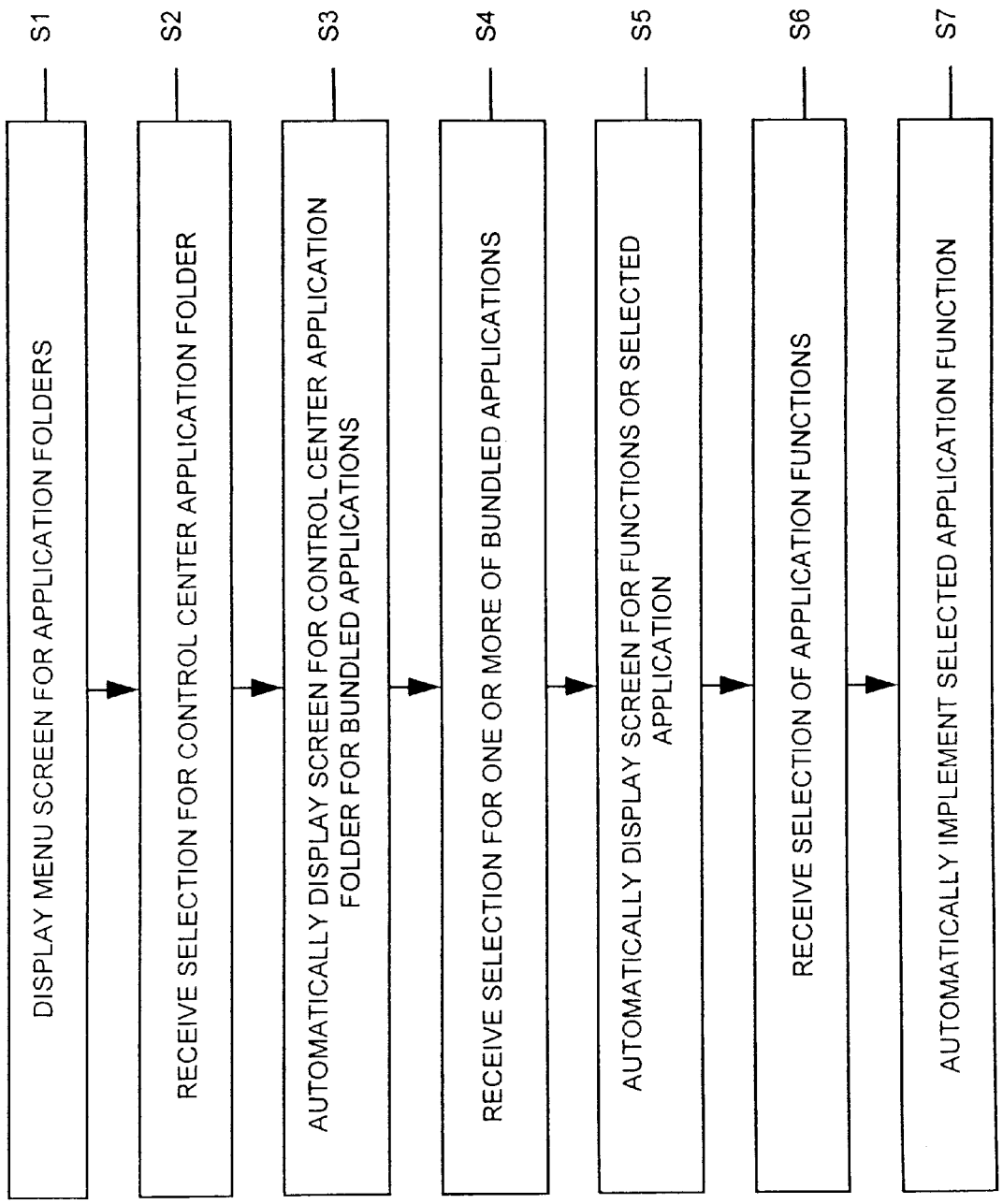
FIG. 7 is a flow chart which illustrates an overview of the process of user interface with the computer system for an embodiment of the present invention.

FIG. 7 is a flow chart which illustrates an overview of the process of user interface with the computer system for an embodiment of the present invention. Referring to FIG. 7, at S1, the system displays Start-Up screen 108 with selections for a number of application folders, including the Living Room Control Center application folder. At S2, the system receives the user's selections of the Living Room Control Center application folder. In response to the selection, at S3, the system automatically displays a screen for the Living Room Control Center application folder for the plurality of bundled applications. At S4, the user enters a selection for one or more of the bundled applications. In response to the selection, at S5, the system automatically displays a screen for one or more application functions for the selected application or applications. At S6, the user enters a selection for one or more application functions. In response to the selection, at S7, the system automatically implements the selected application function or functions.

In an embodiment of the present invention, the user clicks on the Living Room Control Center icon 120 to activate one of four displays of alternate living room graphics in the application file, each of which represents a Living Room Control screen. FIGS. 8–11 show sample Living Room Control screens 122, 124, 126, and 128 for user interface for an embodiment of the present invention. The user can call another Living Room Control screen using the PC keyboard or remote control by using the mouse function to point the cursor to anywhere within the currently displayed Living Room Control screen 122, clicking the right mouse button on the keyboard 54 or remote control 66, and selecting a Preference button to change from the currently displayed alternate Living Room Control screen 122 to another of the alternate Living Room Control screens 124, 126, or 128.

In an embodiment of the present invention, in order to invoke one of the preloaded software applications 82, the user moves the cursor into one of the corresponding graphic components displayed on the Living Room Control screen 122 to automatically display a function message represented by the particular graphic component, such as "Telephone", represented by the graphic telephone component 130. The user then checks for the function message displayed, such as "Audio", "Video", "Telephone", or "Video Capture" and double clicks the left mouse button on the appropriate function message to invoke the particular application. Alternately, using the remote control unit 66, the user invokes one of the preloaded software applications 82 by pressing one of the single function keys 68 on remote control 66, such as "Audio", "Video", "Tel", or "VC." In order to turn off Living Room Control screen 122, the user points the cursor to the "Power" button 132 displayed on the toolbar above the screen 122 and clicks the left button on the mouse function of keyboard 54 or remote control unit 66. All of the applications 82 are transparent to the user in the graphic component, and each alternate Living Room Control screen graphic display 122, 124, 126, and 128 has a different appearance.

Figure 8:
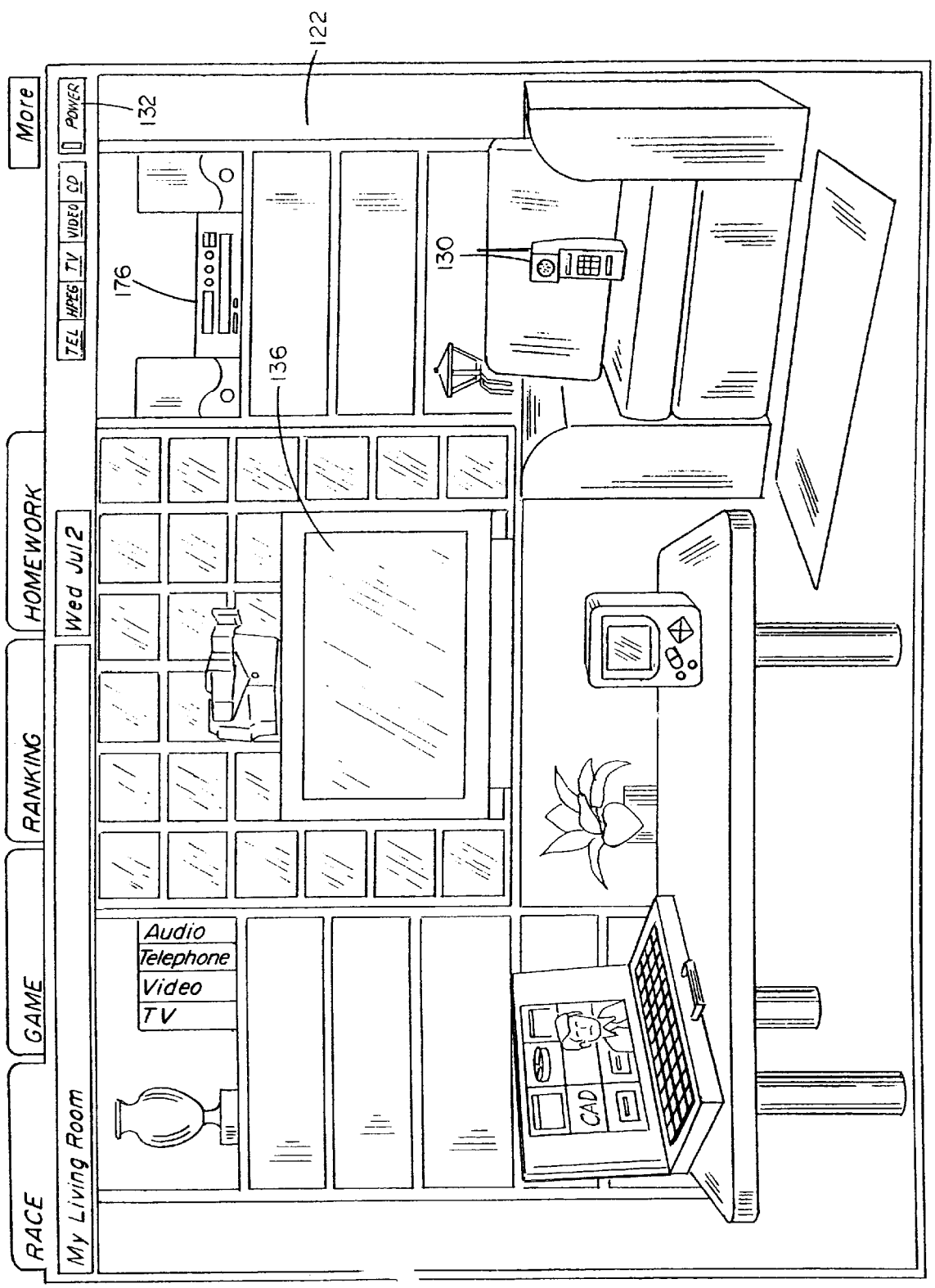
FIG. 8 shows a sample Living Room Control screen user interface for an embodiment of the present invention.
Figure 9:
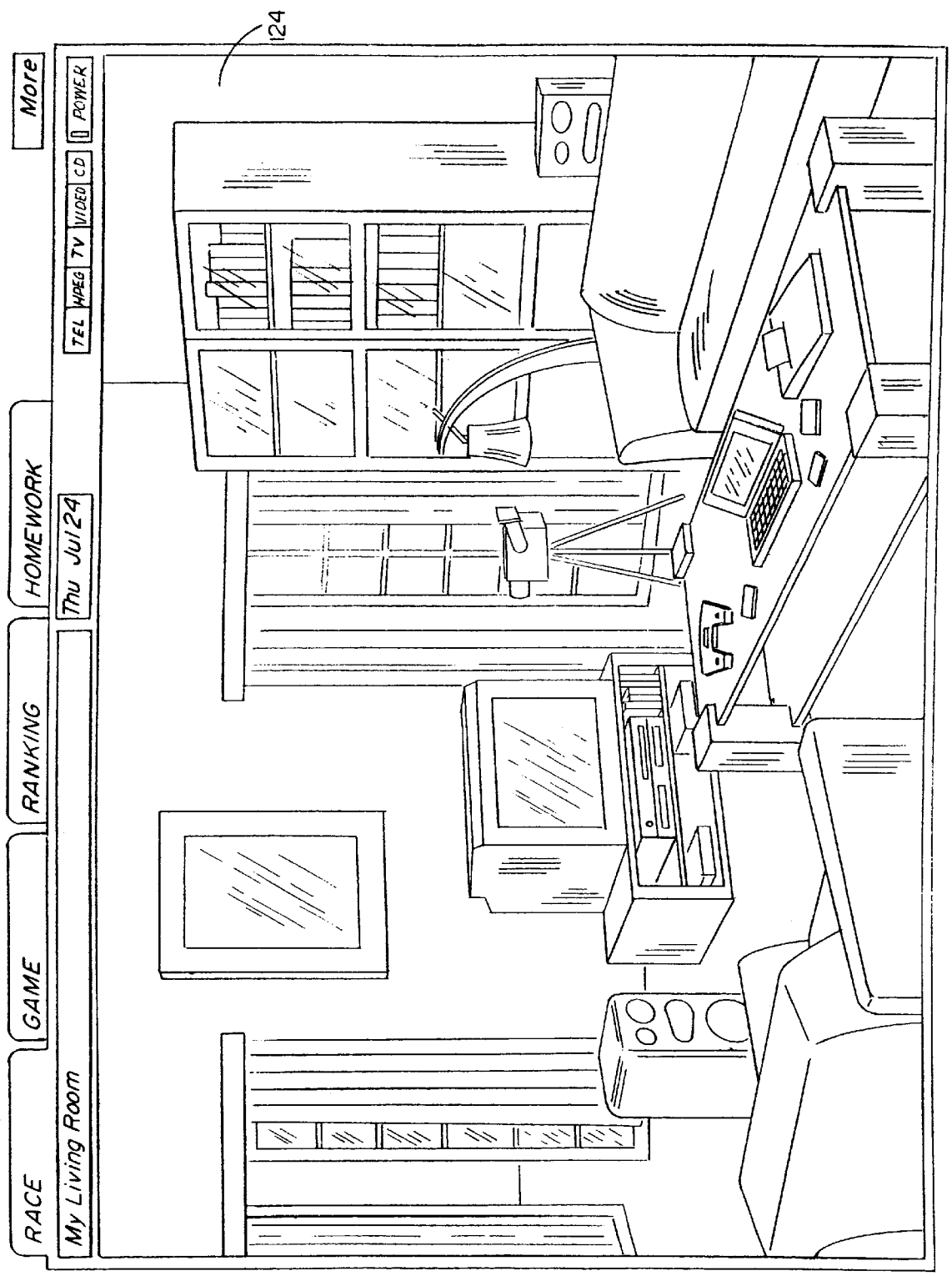
FIG. 9 shows a sample alternate Living Room Control screen for user interface for an embodiment of the present invention.
Figure 10:
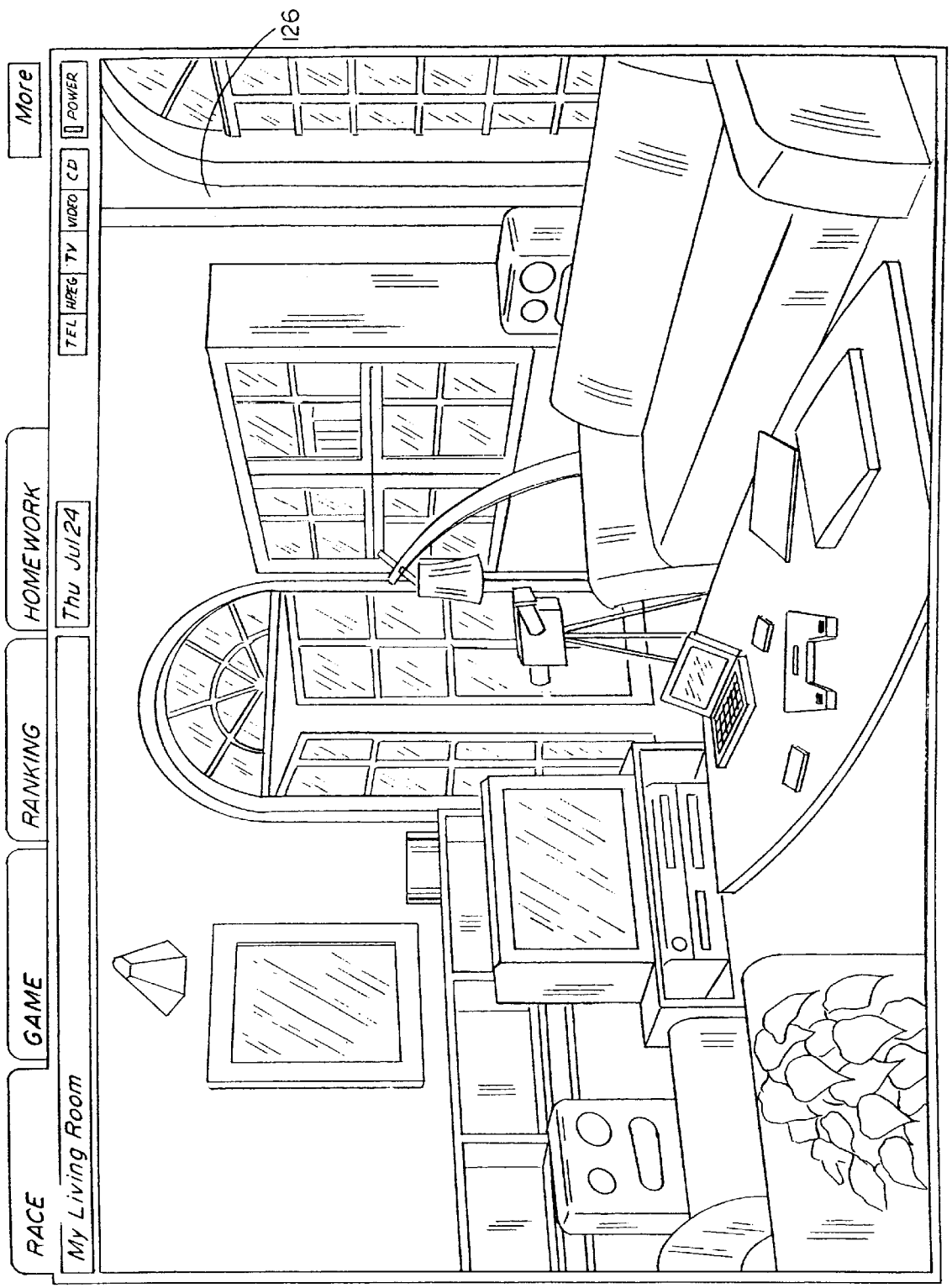
FIG. 10 shows a sample second alternate Living Room Control screen for user interface for an embodiment of the present invention.
Figure 11:
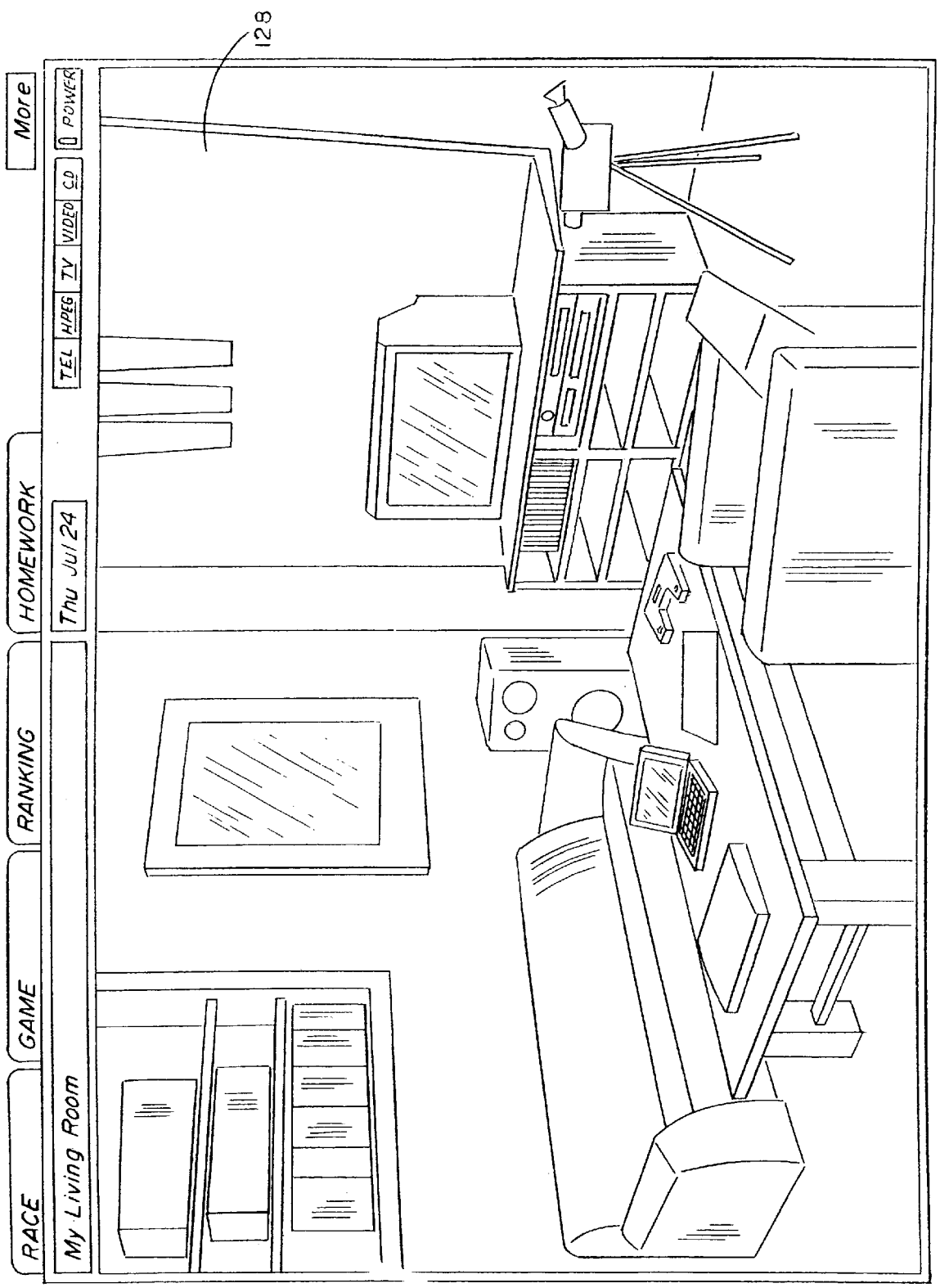
FIG. 11 shows a sample third alternate Living Room Control screen for user interface for an embodiment of the present invention.
Figure 12:
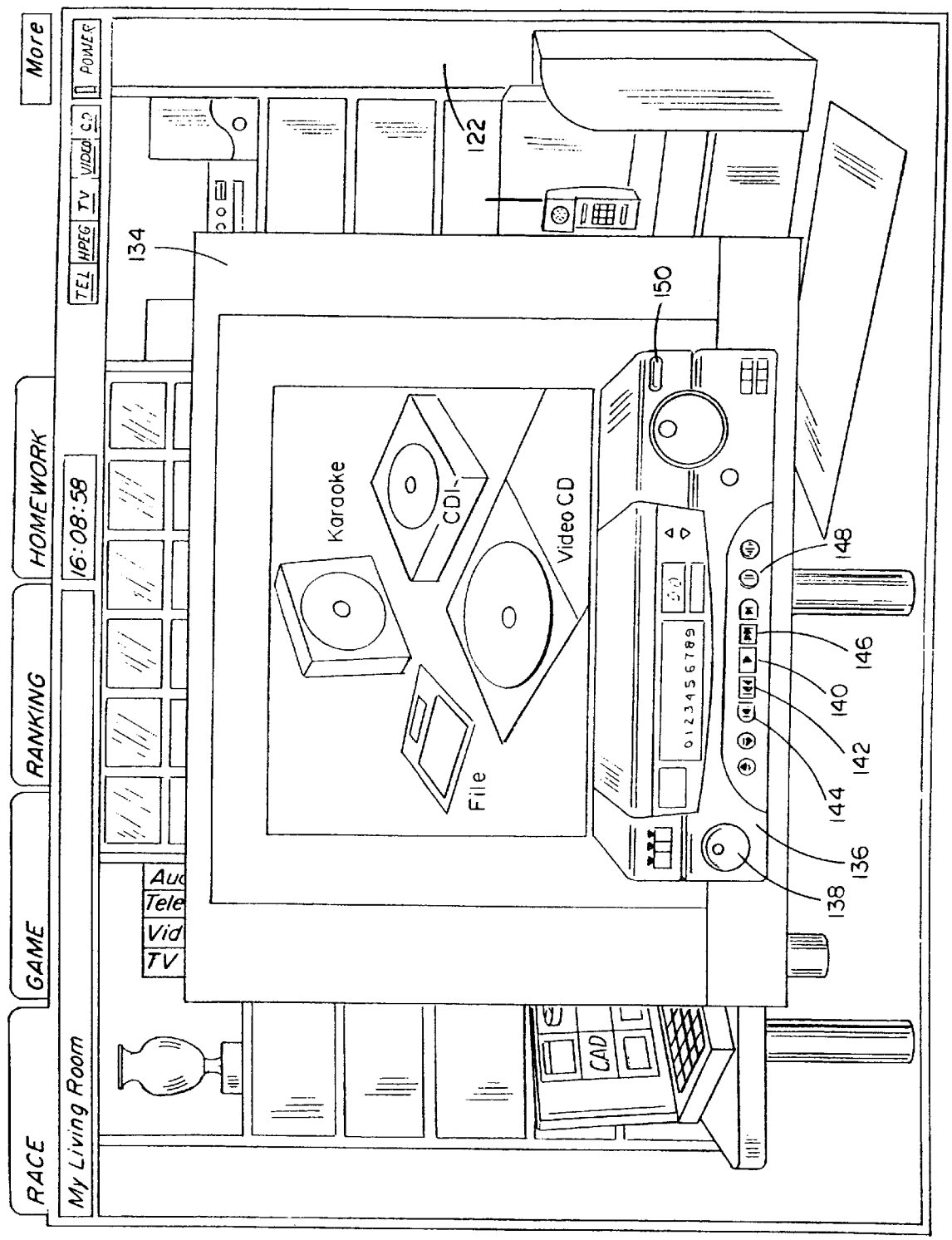
FIG. 12 shows a sample Video Disk Player screen for user interface for an embodiment of the present invention.

In an embodiment of the present invention, the Video Disk Player application 88 can be invoked by the user from one of the Living Room Control screens 122, 124, 126, and 128 to allow the user to play back Video-CD, Karaoke-CD, Movie-CD, or DVD (if the user's PC is Motion Pictures Expert Group II (MPEGII) equipped). FIG. 12 shows a sample Video Disk Player screen 134 for user interface for an embodiment of the present invention. The user invokes the Video Disk Player screen application 88 by clicking on the Video icon 136 displayed in the Living Room Control screen 122 as shown in FIG. 8. In order to play a movie, the user inserts a disk into the CD ROM 8 of the PC 4 and calls up the Video Disk Player screen 134 and selects the screen mode which the user desires. The user can select one of three screen modes, namely Full Screen, Fixed Windows screen, or Move Around Windows screen. The Video Disk Player screen 134 includes graphics displaying a video disk player 136 with control graphics corresponding to control options. From the keyboard 54 or remote control unit 66, the user has full control options, for example, for control of Volume, Forward, Reverse, Freeze Picture, Pause, and Disk Ejecting by moving the cursor to one of the corresponding graphic elements 138, 140, 142, 144, 146, 148 and clicking. In order to turn the Video Disk Player application 88 off, the user points the cursor at the "Power" button 150 displayed on the Video Disk Player screen 134 and clicks the left mouse function button.

Figure 13:
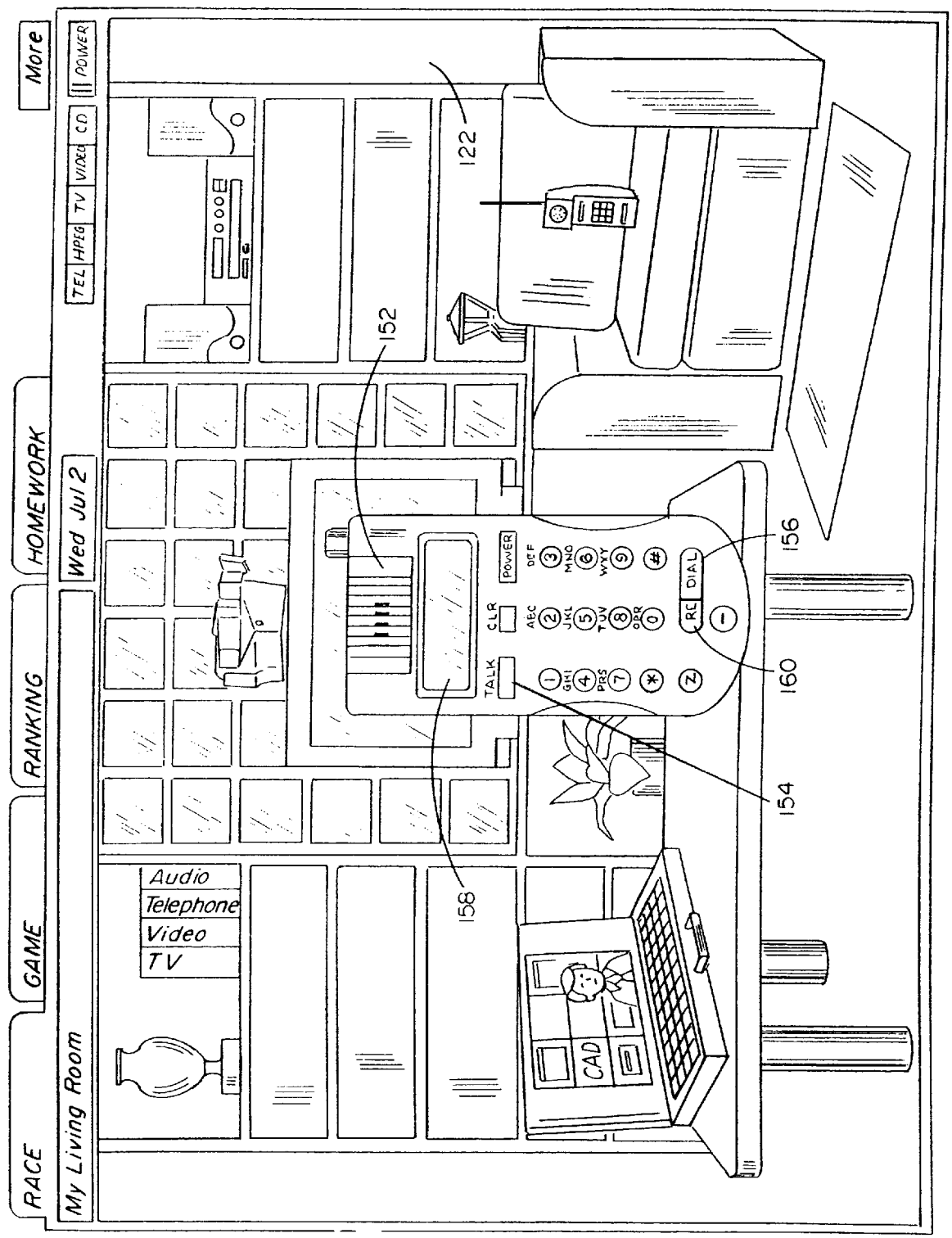
FIG. 13 shows a sample Smart Telephone screen for user interface for an embodiment of the present invention.

In an embodiment of the present invention, the Smart Telephone screen application 96 allows the user to make or answer a telephone call from the PC 4 using a microphone connected to the PC 4. FIG. 13 shows a sample Smart Telephone screen 152 for user interface for an embodiment of the present invention. The user invokes the Smart Telephone screen application 96 by clicking on the Telephone icon 130 displayed on the Living Room Control screen 122. The Smart Telephone screen graphics 152 include a telephone device displayed on the screen with appropriate function buttons. In order to answer the telephone, the user clicks the Talk button 154 depicted on the telephone device displayed on the Smart Telephone screen 152. In order to make a telephone call, the user dials a telephone number from the keyboard 54 or remote control unit 66, then clicks the Dial function 156 depicted on the telephone device displayed on the Smart Telephone screen 152 or the "Enter" key on the keyboard 54. The Smart Telephone application 96 is equipped with a Caller ID feature 158 and Last Number Redial and Speed Dialing memories 160. In order to turn off the Smart Telephone application 96, the user points the cursor at the "Power" button 162 displayed on the Smart Telephone screen 152 and clicks.

Figure 14:
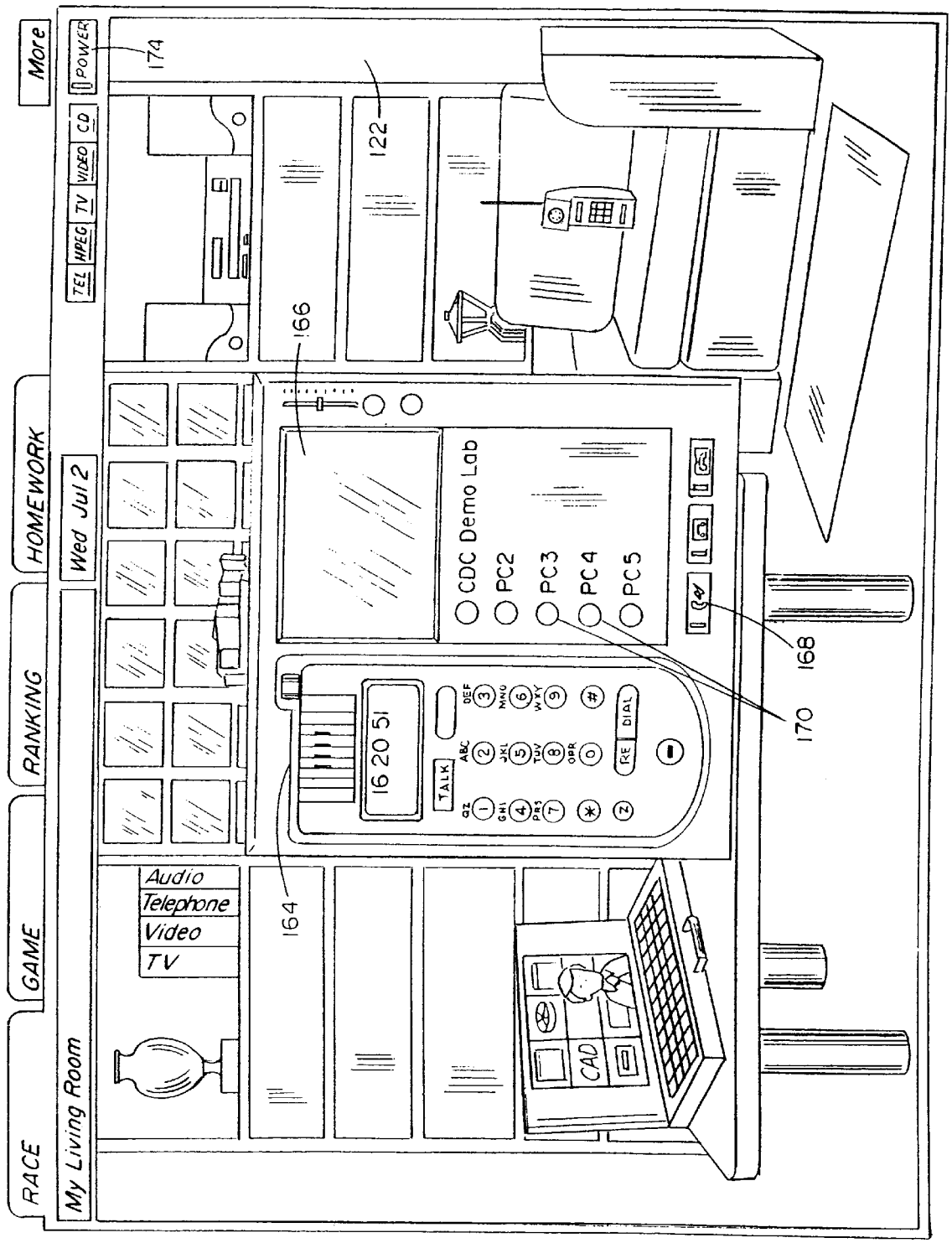
FIG. 14 shows a sample Two-Way Video Phone screen for user interface for an embodiment of the present invention.

In an embodiment of the present invention, a Two-Way Video Phone screen uses the CCD camera or camcorder connected to the PC 4. FIG. 14 shows a sample Two-Way Video Phone screen 164 for user interface for an embodiment of the present invention. The user clicks the TV icon 136 displayed on the Living Room Control screen 122 to invoke the Two-Way Video Phone application 98. The user dials calls in the same manner as a telephone call. Another party to a two-way video phone call must have the same system configuration as the user. After a connection is made, a second screen 166 appears on the Two-Way Video Phone screen 164. The Video Transmit function can be disabled by the user clicking the lower icon 168 on the right side of the user's screen 166. The Two-Way Video Phone application 98 allows the user to pre-program up to five speed dial numbers. In order to enter information, the user points the cursor to one of the buttons 170 displayed on the Two-Way Video Phone screen 166 and clicks the mouse right button on the keyboard 54. To turn off the Two-Way Video Phone application 98, the user clicks on the "Power" button 172 displayed on the toolbar 174.

Figure 15:
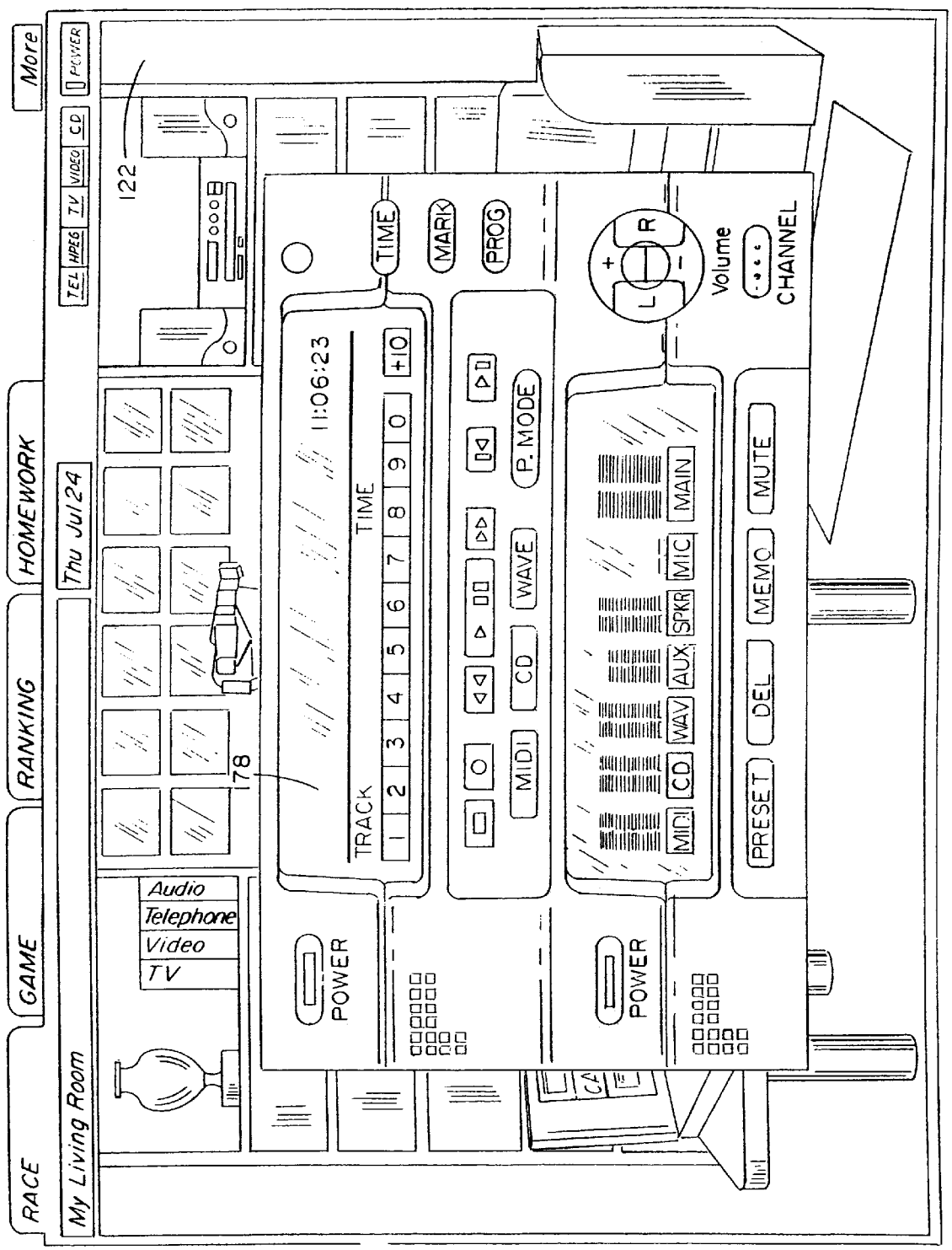
FIG. 15 shows a sample Music CD Player and Equalizer screen for user interface for an embodiment of the present invention.

In an embodiment of the present invention, the Music CD application 84 is invoked by the user double clicking the Stereo icon 176 displayed on the Living Room Control screen 122, as shown in FIG. 8, from the keyboard 54 or pressing the Audio key of the single function keys 68 on the remote control unit 66. FIG. 15 shows a sample Music CD Player and Equalizer screen 178 for user interface for an embodiment of the present invention. The Equalizer application 86 appears only when the user presses the Volume control of the audio control keys 74 on the remote unit 66. The user inserts a music CD into the CD-ROM 8 of the user's PC 4. The Music CD application 84 can be minimized by the user to enjoy the music while the user works on another application. In order to turn off the Music CD application 84, the user clicks the "Power" button from the keyboard 54 or presses the Audio key of the single function keys 68 on the remote control unit 66 again.

Figure 16:
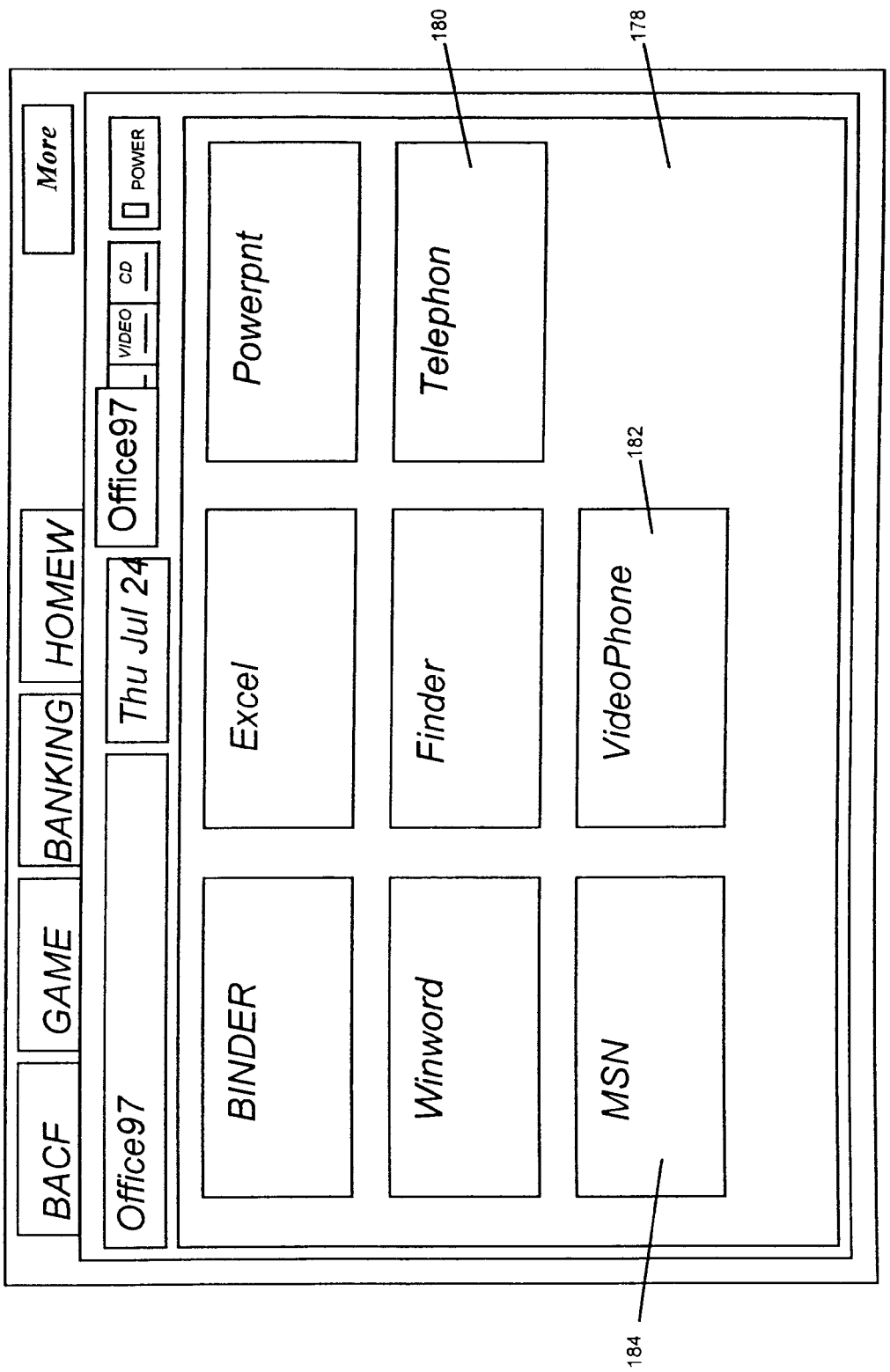
FIG. 16 shows a sample Office 97 screen for user interface for and embodiment of the present invention.

In an embodiment of the present invention, the Office 97 screen relates to the Microsoft Office 97 folder. However, the user interface is designed to optimize for TV output and is suitable for the user to operate from a distance, such as the user's living room. FIG. 16 shows a sample Office 97 screen 178 for user interface for an embodiment of the present invention. The fonts of all applications in the Office 97 application screen 178 are large sized and in highly contrasting color for easy viewing by the user. A word processing application 104, such as Microsoft Office 97, Lotus Organizer, or the like, can be loaded into the user's PC 4 by using the regular Windows installation procedure. The user can create an executable button for the word processing application on the Office 97 screen 178. All files created by the Office 97 folder are stored in the My Document directory of Windows 95 as usual. Buttons for Telephone 180, Video Phone 182, and Internet Access 184 are repeated in all folders for user convenience.

Figure 17:
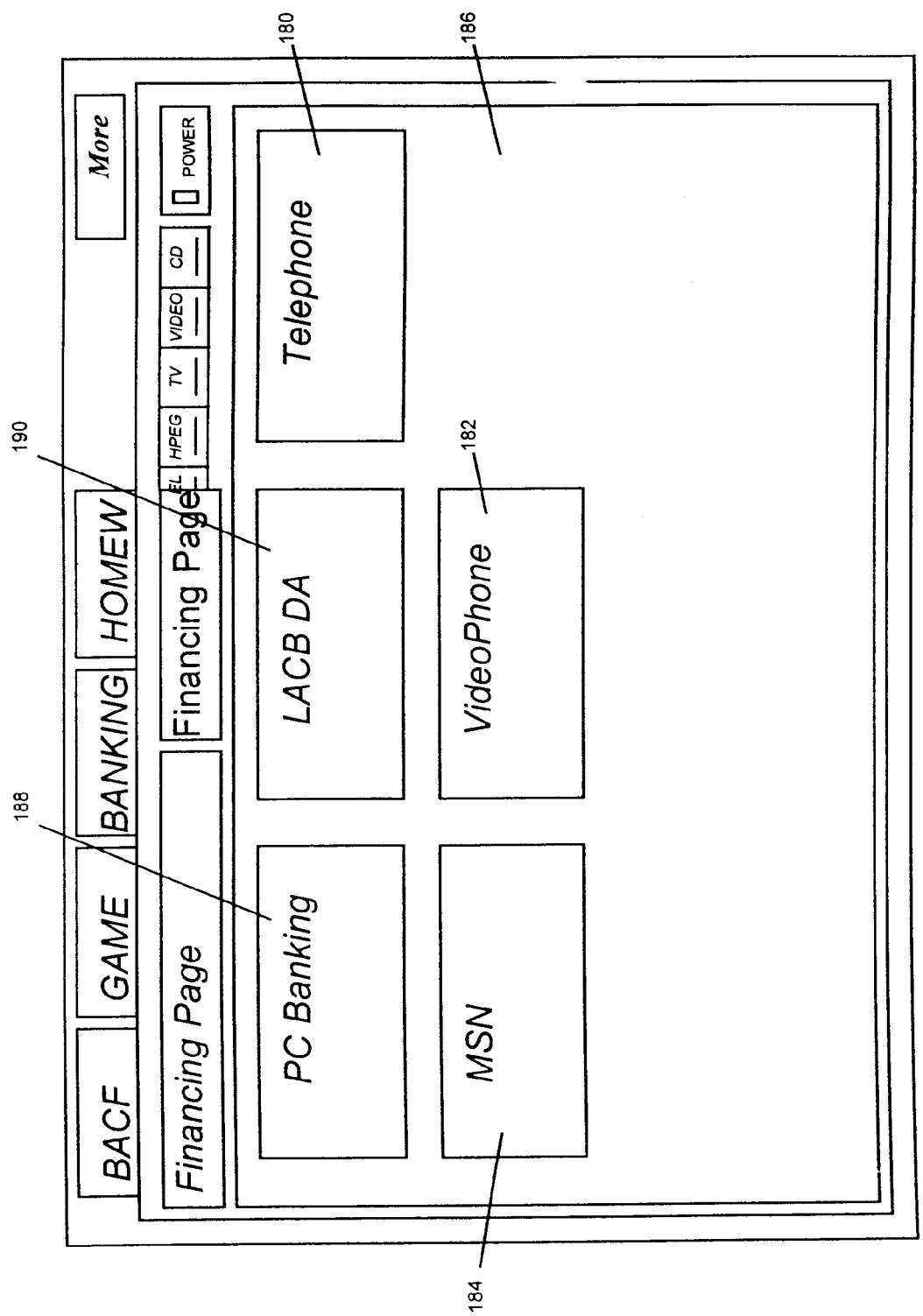
FIG. 17 shows a sample Home Banking Folder screen for user interface for an embodiment of the present invention.

In an embodiment of the present invention, a Home Banking Folder screen is reserved for the user's private and personal financial information. FIG. 17 shows a sample Home Banking Folder screen 186 for user interface for an embodiment of the present invention. The user can load any home banking software or utilities bill payment software into the user's PC 4 by using the regular Windows 95 installation procedure. The sample Home Banking Folder screen 186 is tailored to a specific financial institution, Citibank, but is not intended to limit or restrict the method and system of the present invention. The user can create an executable button 188 on the Home Banking Folder 102 by clicking the mouse right button on the keyboard 54 and selecting an "Add Button" function to enter information such as executable files of the program. For Internet banking, such as Citibank Direct Access 190, the user opens the user's ISP and goes to the website of the user's bank, for example, to Citibank.Com. The user's PC is programmed, for example, with the Citibank website as the home page when the user opens the user's ISP. In order to use the home banking function, the user presses the Browser button of the single function keys 68 on the remote control unit 66 and the user's browser automatically goes to the Citibank website or the home page after the modem communication is connected.

Figure 18:
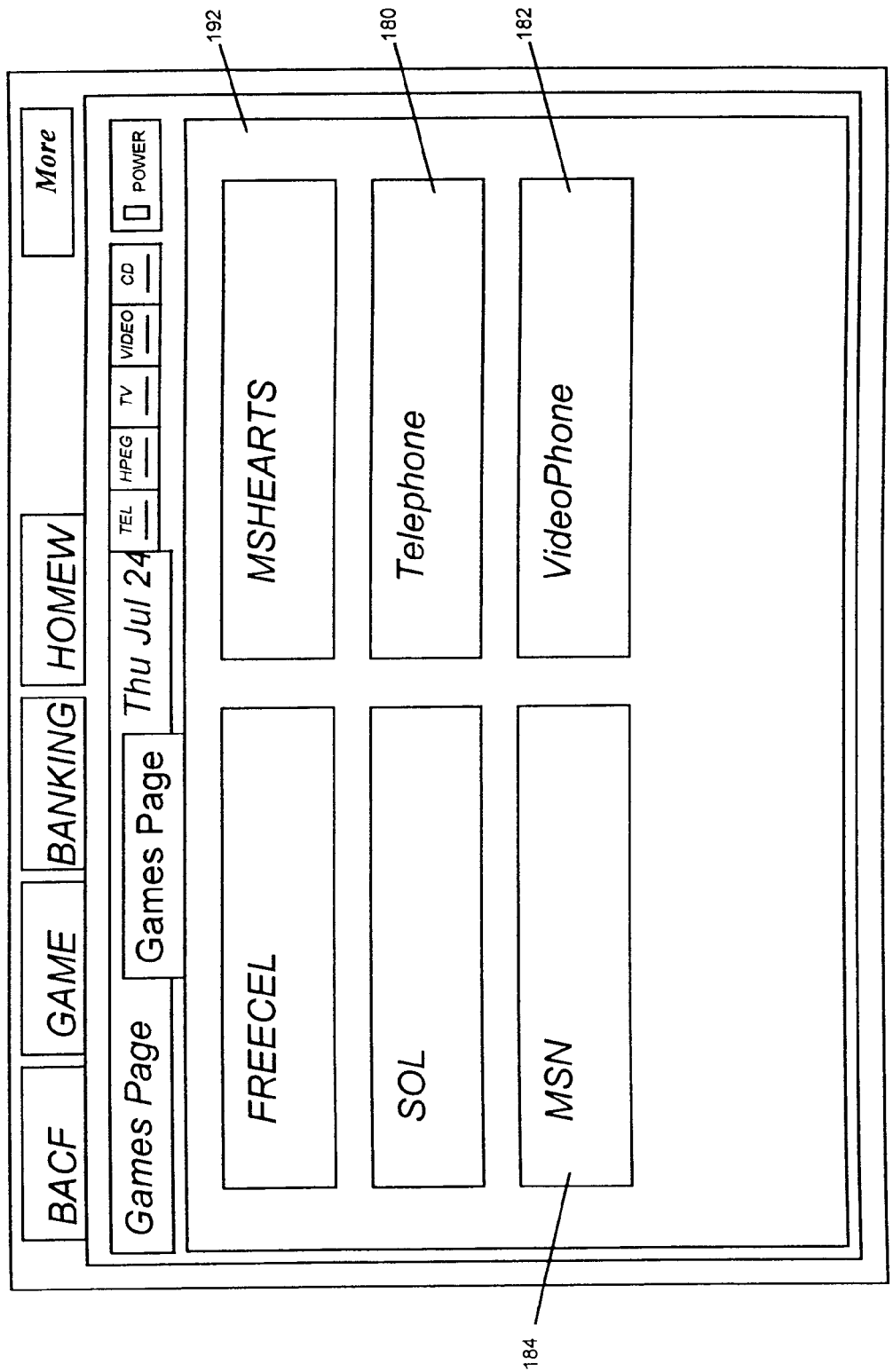
FIG. 18 shows a sample PC Games Folder screen for user interface for an embodiment of the present invention.

In an embodiment of the present invention, the user can also load computer games into the user's PC 4 by using the regular Windows 95 software installation procedure. FIG. 18 shows a sample PC Games Folder screen 192 for user interface for an embodiment of the present invention. After the user loads a PC game into the user's PC 4, the user goes to the PC Games Folder 192 and clicks the mouse right button on the keyboard 54. The user then uses the "Add Button" function to enter an executable file of the game. If the PC game is required to be run with a CD-ROM, the user can create a button on the PC Games Folder 192 and insert the CD-ROM into the PC 4 each time the user wishes to play the game. It is not necessary for the user to create a button on the PC Games Folder 192 for game gears, such an Nintendo, Sega, Sony, or NEC. Instead, the user can connect the game console directly to the PC 4 via the DB-15 game port connector 44.

Various preferred embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention. Accordingly, the invention is only limited by the following claims.

What is claimed is:

1. A method of user interface for a computer system, comprising:

preloading a computing device with an operating system and a plurality of bundled applications including a home banking application, an Internet access application, a word processing application, and a browser application, and a plurality of living room control center applications selected from a group consisting of video disk player applications, smart telephone applications, two-way video phone applications, and music CD applications;

receiving a selection for a living room control center application folder representing the plurality of living room control center applications for the computer system via an input device communicating with the computer system and operable by a user to selectively invoke and control the bundled applications;

automatically displaying a screen for the living room control center application folder on a viewing screen of a television set coupled to the computing device with a graphical depiction of a living room on the display screen populated with depictions of a plurality of actual appliances indicative of corresponding ones of the living room control center applications;

receiving a selection for at least one of the living room control center applications represented by the living room control center application folder by clicking on the depiction of the actual appliance corresponding to the selected living room control center application via the input device;

automatically displaying a screen for a plurality of control functions for the selected living room control center application depicting actual control devices of the selected appliance;

receiving a selection for at least one of the living room control center application control functions by clicking on the depiction of the actual control device for the selected function via the input device; and automatically implementing the selected living room control center application function in accordance with the selected living room control center application control function.

2. The method of claim 1, wherein receiving the selection for the living room control center application folder further comprises automatically displaying a menu screen for a plurality of folders for the computer system.

3. The method of claim 1, wherein receiving the selection for the living room control center application folder further comprises entering the selection.

4. The method of claim 3, wherein entering the selection for the living room control center application folder further comprises entering the selection by a user at a computer.

5. The method of claim 4, wherein entering the selection for the living room control center application folder by the user further comprises automatically prompting the user to enter the selection.

6. The method of claim 1, wherein automatically displaying the screen for the living room control center application folder further comprises automatically displaying one of a plurality of screens for the living room control center application folder.

7. The method of claim 6, wherein automatically displaying one of the plurality of screens further comprises receiving a selection for an alternate screen for the living room control center application folder.

8. The method of claim 7, wherein receiving the selection for the alternate screen further comprises automatically displaying the alternate screen.

9. The method of claim 7, wherein receiving the selection for the alternate screen further comprises entering the selection.

10. The method of claim 9, wherein entering the selection for the alternate screen further comprises entering the selection by a user at a computer.

11. The method of claim 10, wherein entering the selection for the alternate screen by the user further comprises automatically prompting the user to enter the selection.

12. The method of claim 1, wherein automatically displaying the screen for the living room control center application folder further comprises automatically displaying at least one actual appliance selected from a group consisting of a video appliance, a telephone appliance, a TV appliance, and a stereo appliance.

13. The method of claim 12, further comprising automatically displaying a home banking application folder button.

14. The method of claim 12, wherein automatically displaying at least one actual appliance further comprises automatically displaying the video appliance.

15. The method of claim 14, wherein automatically displaying the video appliance further comprises automatically displaying a video disk player appliance.

16. The method of claim 15, wherein automatically displaying the video disk player appliance further comprises automatically displaying at least one video disk player appliance selected from a group consisting of a video CD appliance, a karaoke CD appliance, a movie CD appliance, and a DVD appliance.

17. The method of claim 12, wherein automatically displaying at least one actual appliance further comprises automatically displaying the telephone appliance.

18. The method of claim 17, wherein automatically displaying the telephone appliance further comprises automatically displaying a smart telephone appliance.

19. The method of claim 18, wherein automatically displaying the smart telephone appliance further comprises automatically displaying at least one smart telephone appliance selected from a group consisting of a dial appliance, a talk appliance, a caller ID appliance, a last number redial appliance, and a speed dial appliance.

20. The method of claim 12, wherein automatically displaying at least one actual appliance further comprises automatically displaying a depiction of the TV appliance.

21. The method of claim 20, wherein automatically displaying the TV appliance further comprises automatically displaying a two-way video phone appliance.

22. The method of claim 21, wherein automatically displaying the two-way video phone appliance further comprises automatically displaying at least one two-way video phone appliance selected from a group consisting of a camera appliance, a dial appliance, a talk appliance, a caller ID appliance, a last number redial appliance, and a speed dial appliance.

23. The method of claim 12, wherein automatically displaying at least one actual appliance further comprises automatically displaying the stereo appliance.

24. The method of claim 23, wherein automatically displaying the stereo appliance further comprises automatically displaying a music CD appliance.

25. The method of claim 24, wherein automatically displaying the music CD appliance further comprises automatically displaying at least one music CD appliance selected from a group consisting of a music CD player appliance and an audio equalizer appliance.

26. The method of claim 1, wherein receiving the selection for at least one of the living room control center applications further comprises entering the selection.

27. The method of claim 26, wherein entering the selection for at least one of the living room control center applications further comprises entering the selection by a user at a computer.

28. The method of claim 27, wherein entering the selection for at least one of the living room control center applications by the user further comprises automatically prompting the user to enter the selection.

29. The method of claim 1, wherein receiving the selection for at least one of the living room control center applications further comprises receiving a selection for the video disk player application.

30. The method of claim 1, wherein receiving the selection for at least one of the living room control center applications further comprises receiving a selection for the smart telephone application.

31. The method of claim 1, wherein receiving the selection for at least one of the living room control center applications further comprises receiving a selection for the music CD application.

32. The method of claim 1, further comprising receiving a selection for the home banking application.

33. The method of claim 32, wherein receiving the selection for the home banking application further comprises receiving the selection for the home banking application of a pre-selected financial institution.

34. The method of claim 1, wherein automatically displaying the screen for the plurality of control functions further comprises automatically displaying at least one actual control for a video disk player application selected from a group consisting of a screen mode control, a volume control, a forward control, a reverse control, a freeze picture control, a pause control, a disk ejecting control, and a power control.

35. The method of claim 1, wherein automatically displaying the screen for the plurality of control functions further comprises automatically displaying at least one actual control for a smart telephone application selected from a group consisting of a talk control, a dial control, and a power control.

36. The method of claim 1, wherein automatically displaying the screen for the plurality of control functions further comprises automatically displaying at least one actual control for a two-way video phone application selected from a group consisting of a talk control, a dial control, a video transmit control, and a power control.

37. The method of claim 1, wherein automatically displaying the screen for the plurality of control functions further comprises automatically displaying at least one actual control for a music CD player application selected from the group consisting of a volume control and a power control.

38. The method of claim 1, wherein receiving the selection for at least one application control function further comprises entering the selection.

39. The method of claim 38, wherein entering the selection for at least one application control function further comprises entering the selection by a user at a computer.

40. The method of claim 39, wherein entering the selection for at least one application control function by the user further comprises automatically prompting the user to enter the selection.

41. The method of claim 1, wherein the video disk player application further comprises at least one function selected from a group consisting of a video CD function, a karaoke CD function, a movie CD function, and a DVD function.

42. The method of claim 1, wherein the smart telephone application further comprises at least one function selected from a group consisting of a dial function, a talk function, a caller ID function, a last number redial function, and a speed dial function.

43. The method of claim 1, wherein the two-way video phone application further comprises at least one function selected from a group consisting of a camera function, a dial function, a talk function, a caller ID function, a last number redial function, and a speed dial function.

44. The method of claim 1, wherein the music CD application further comprises at least one function selected from a group consisting of a music CD player function and an audio equalizer function.

45. The method of claim 1, further comprising receiving a selection for a browser function for the home banking application.

46. The method of claim 45, wherein receiving the selection for the browser function further comprises receiving the selection for a browser function pre-programmed for the home banking application of a pre-selected financial institution.

47. The method of claim 1, wherein automatically implementing the selected application function further comprises automatically implementing at least one video disk player application function selected from a group consisting of a video CD function, a karaoke CD function, a movie CD function, and a DVD function.

48. The method of claim 1, wherein automatically implementing the selected living room control center application function further comprises automatically implementing at least one smart telephone application function selected from a group consisting of a dial function, a talk function, a caller ID function, a last number redial function, and a speed dial function.

49. The method of claim 1, wherein automatically implementing the selected living room control center application function further comprises automatically implementing at least one two-way video phone application function selected from a group consisting of a camera function, a dial function, a talk function, a call ID function, a last number redial function, and a speed dial function.

50. The method of claim 1, wherein automatically implementing the selected living room control center application function further comprises automatically implementing at least one video music CD application function selected from a group consisting of a music CD player function and an audio equalizer function.

51. The method of claim 1, further comprising automatically implementing a browser function for a home banking application.

52. The method of claim 51, wherein automatically implementing the browser function further comprises automatically implementing the browser function of the home banking application of a pre-selected financial institution.

53. The method of claim 52, wherein automatically implementing the browser function for the home banking application of the pre-selected financial institution further comprises automatically initiating communication with the financial institution.

54. The method of claim 53, wherein automatically initiating communication with the financial institution further comprises automatically initiating the communication over a computer network.

55. A system for user interface for a computer control center, comprising:

a computer system preloaded with an operating system and a plurality of bundled applications including a home banking application, an Internet access application, a word processing application, and a browser application, and a plurality of living room control center applications selected from a group consisting of video disk player applications, smart telephone applications, two-way video phone applications, and music CD applications;

wherein the computer system is preprogrammed for receiving a selection of a living room control center application folder representing the plurality of living room control center applications for the computer system via an input device communicating with the computer system and operable by a user to selectively invoke and control the bundled applications and automatically displaying a screen for the living room control center application folder on a viewing screen of a television set coupled to the computing device with a graphical depiction of a living room on the display screen populated with depictions of a plurality of actual appliances indicative of corresponding ones of the living room control center applications;

wherein the computer system is also preprogrammed for receiving a selection of at least one of the plurality of living room control center applications represented by the living room control center application folder by clicking on the depiction of the actual appliance corresponding to the selected living room control center application via the input device and automatically displaying a plurality of control functions for the selected living room control center application depicting actual control devices of the selected appliance; and wherein the computer system is further preprogrammed for receiving a selection of at least one of the living room control center functions by clicking on the depiction of the actual control device via the input device and automatically implementing the selected living room control center function in accordance with the selected living room control center application control function.

56. The system of claim 55, wherein the home banking application further comprises a home banking application for a pre-selected financial institution.

57. The system of claim 56, wherein the home banking application further comprises a browser associated with the home banking application.

58. The system of claim 57, wherein the browser associated with the home banking application further comprises a browser pre-programmed to the web-site of the pre-selected financial institution.

* * * * *